United States Patent [19]

Martinek

[11] 4,346,738
[45] Aug. 31, 1982

[54] OVERWRAP CASING AND METHOD OF APPLYING SAME

[75] Inventor: Thomas W. Martinek, Covington, Ind.

[73] Assignee: Teepak, Inc., Chicago, Ill.

[21] Appl. No.: 271,886

[22] Filed: Jun. 9, 1981

[51] Int. Cl.³ .................... F16L 11/00; B65B 11/00; B65D 85/20

[52] U.S. Cl. .................. 138/118.1; 138/109; 53/397; 53/409; 206/446; 206/525; 206/802; 428/36

[58] Field of Search .......... 53/397, 409, 204, 576; 206/525, 446, 802; 138/109, 118.1; 428/36

[56] References Cited

U.S. PATENT DOCUMENTS

| | | | |
|---|---|---|---|
| 2,418,657 | 4/1947 | Moritz | 53/204 |
| 2,521,833 | 9/1950 | Dahl | 53/204 |
| 3,437,195 | 4/1969 | Hill | 53/409 |
| 3,585,775 | 6/1971 | Stenniken | 53/397 |
| 3,639,130 | 2/1972 | Eichen et al. | 206/446 |
| 4,007,761 | 2/1977 | Beckman | 138/118.1 |
| 4,013,099 | 3/1977 | Gerigk et al. | 138/118.1 |
| 4,263,942 | 4/1981 | Lenhart et al. | 138/118.1 |
| 4,298,119 | 11/1981 | Murray | 206/802 |

*Primary Examiner*—William R. Dixon, Jr.
*Attorney, Agent, or Firm*—Charles E. Brown; Michael L. Dunn; Paul A. Leipold

[57] ABSTRACT

This relates to the encasing of shirred casing strands for the purpose of maintaining the shape thereof during soaking and subsequent to the soaking until such casing strands are applied to a stuffing horn. Each casing strand is encased in an overwrap casing which is applied in tubular form and preferably is in the form of netting. The overwrap casing is shaped at least at one end of the casing strand to define closure panels by twisting the overwrap casing at that end of the associated casing strand so as to reduce the diameter of the overwrap casing and to facilitate the reverse folding of the overwrap casing. The opposite end of the overwrap casing may be closed in a similar manner or by a simple gathering of the material of the overwrap casing and the application of a conventional clip. This abstract forms no part of the specification of this application and is not to be construed as limiting the claims of the application.

23 Claims, 9 Drawing Figures

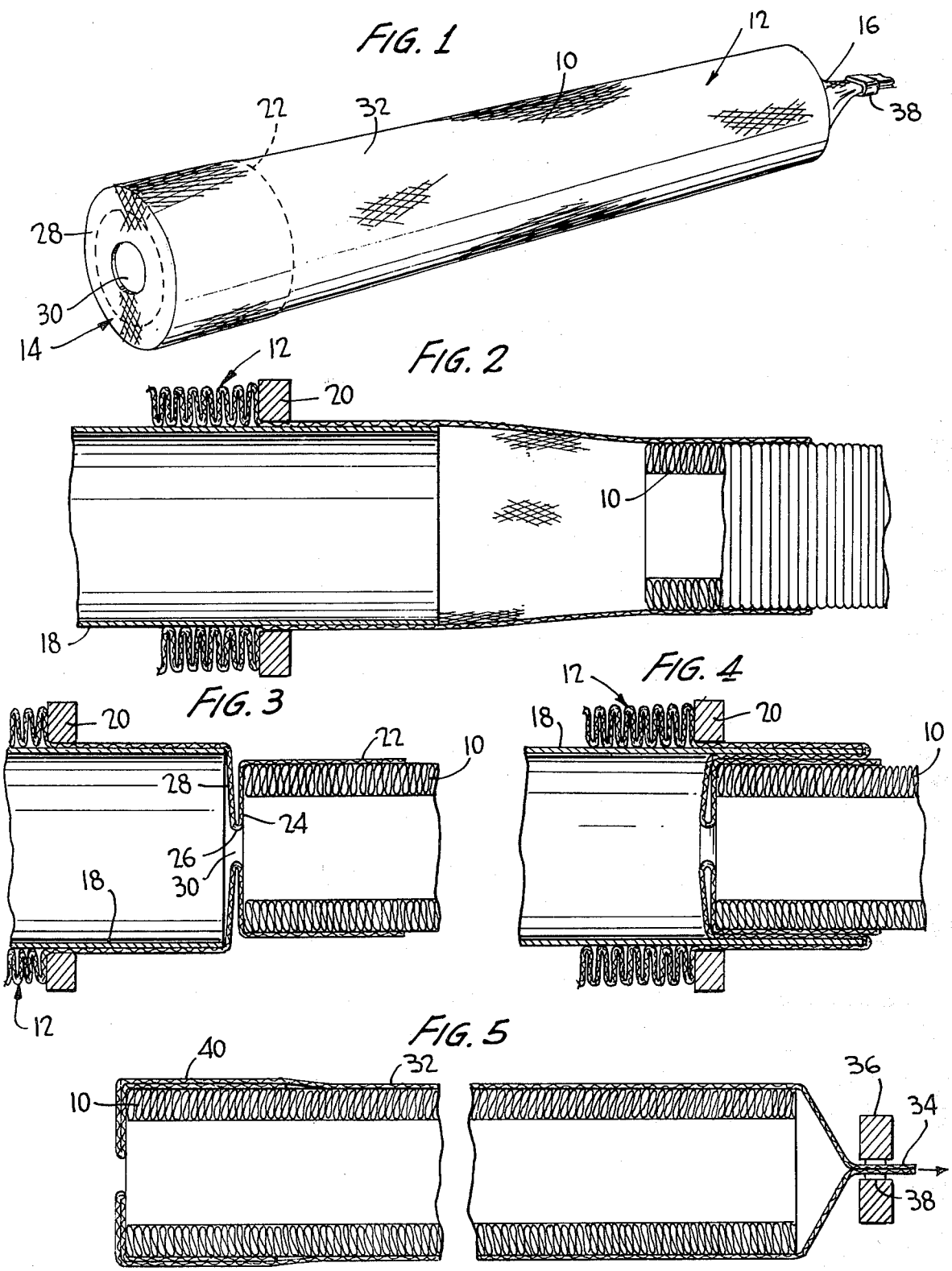

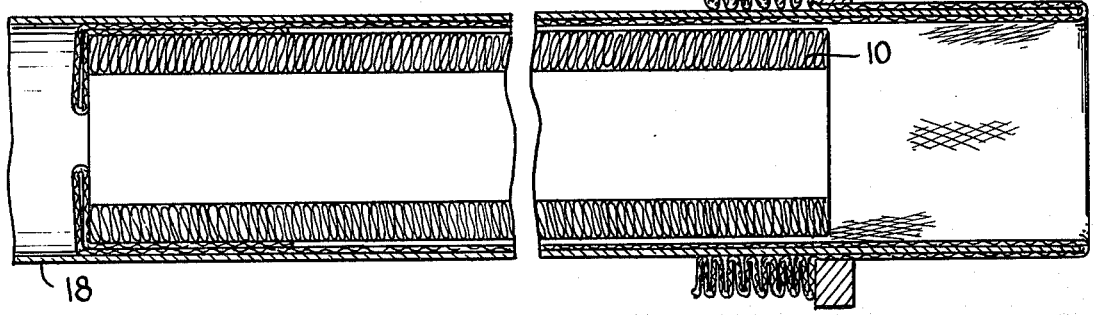
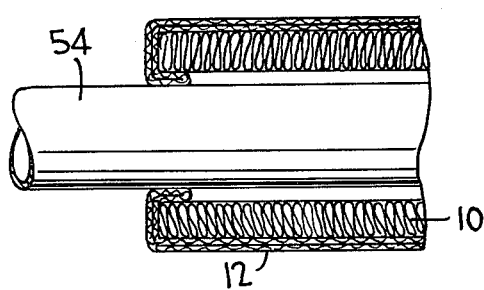
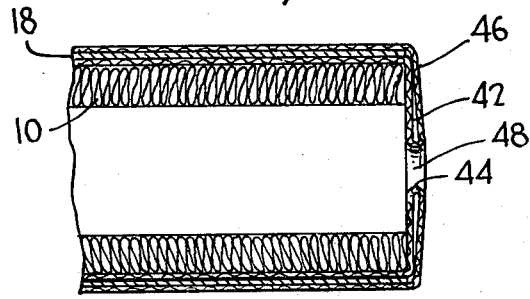
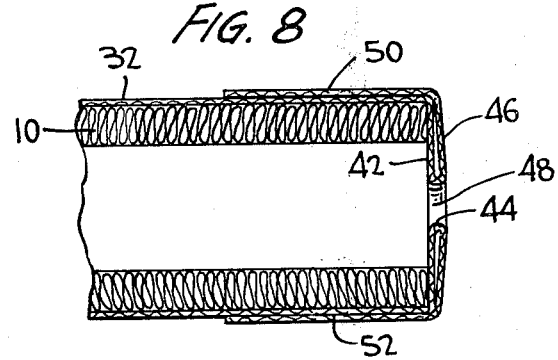

OVERWRAP CASING AND METHOD OF APPLYING SAME

This invention relates in general to new and useful improvements in shirred casing stands, and more particularly to an overwrap which may be applied to the strand and which will function to retain the shape of the strand during and after soaking of the strand so as to render the material of the strand flexible.

It is known to provide an overwrap for strands of the type to which this invention relates, and such overwrap may be in the form of a suitable casing material or may be in the form of a net. It is, however, customary to provide at one or both ends of the strand a washer or plug which maintains the shape of the strand, particularly the one end thereof, for insertion over a stuffing horn. A typical encased shirred casing strand arrangement is disclosed in the patent to Gerigk et al, U.S. Pat. No. 4,013,099, granted Mar. 22, 1977.

This invention particularly relates to the encasing of a shirred casing strand without the use of any washers, plugs, etc., and wherein the overwrap casing is so formed as to provide an end closure for the shirred casing strand which will serve to maintain the shape of the casing strand and, at the same time, have a desired interfit with the stuffing horn.

In accordance with this invention, an end portion of an overwrap casing is telescoped over one end portion of the casing strand and then twisted. This results in the overwrap casing being interlocked with the exterior of the casing strand and, at the same time, reducing the diameter of the overwrap casing adjacent to but spaced from the one end of the casing strand. The thus necked down overwrap casing may then be readily folded against the end of the casing strand so as to provide a double layer annular end on the overwrap casing. The overwrap casing is now ready to be telescoped over the entire length of the casing strand and suitable closing at the opposite end thereof.

The closing of the overwrap casing at the opposite ends of the casing strand may be by way of a simple gathering of the overwrap casing and securement together with a clip, or the closing may be effected in a manner very similar to that of the overwrap casing at the one end of the casing strand.

In addition, where portions of the overwrap casing are overlapped, they may be suitably secured together to prevent untwisting. Typical securement would be by way of a heat bond when the overwrap casing is formed of a heat bondable material.

A very simple apparatus may be utilized in the application of the overwrap casing and it is preferred that the overwrap casing be in the form of a tubular net material.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a perspective view of a wrapped shirred casing strand formed in accordance with this invention.

FIG. 2 is a schematic sectional view showing the overwrap casing initially applied to one end portion of the casing strand in the first step of applying the overwrap casing.

FIG. 3 is a schematic sectional view similar to FIG. 2, and shows the overwrap casing twisted and necked down and reversely folded at the one end of the casing strand.

FIG. 4 is a schematic sectional view similar to FIG. 2, and shows the overwrap casing being applied the full length of the casing strand.

FIG. 5 is a longitudinal sectional view taken through the encased shirred casing strand, and shows the opposite end of the overwrap casing being closed utilizing a clipping device, an intermediate portion of the casing strand being omitted.

FIG. 6 is a schematic sectional view similar to FIG. 2, and shows an initial step in the closing of the overwrap casing in a manner similar to the closing of the one end.

FIG. 7 is a fragmentary schematic sectional view similar to FIG. 2, and shows the overwrap casing at the opposite end of the casing strand twisted, necked down, and reversely folded.

FIG. 8 is a fragmentary schematic sectional view similar to FIG. 2, and shows a terminal end portion of the overwrap casing telescoped over a body portion of the overwrap casing at the opposite end of the casing strand.

FIG. 9 is a fragmentary schematic sectional view showing the encased shirred casing strand applied to a stuffing horn.

Referring now to the drawings in detail, reference is first made to FIG. 1 wherein there is illustrated a conventional hollow shirred casing strand 10 which is encased within an overwrap casing 12. The overwrap casing 12 is formed of a suitable tubular material which may be penetrated by water or other liquids including lubricating oil. The overwrap casing 12 is preferably in the form of a tubular netting material with the netting material being formed of heat bondable plastic.

In accordance with the invention, the overwrap casing 12 is provided with an end closure 14 at one end of the casing strand 10 and with a suitable closure 16 at the opposite end of the casing strand 10. Thus, the casing strand 10 is completely enclosed within the overwrap casing 12 and the shape thereof is maintained by the overwrap casing 12.

The material of the shirred casing strand 10 is such that it requires soaking in a suitable soaking material which may include water or, in certain instances, lubricating oils, so as to render the material of the shirred casing strand flexible prior to the utilization of the casing strand as a casing for sausage or like products. It is essential that the configuration of the hollow shirred casing strand 10 be maintained during the soaking operation and thereafter until the casing strand 10 has been applied to a stuffing horn of a filling machine wherein its shape is then maintained by the stuffing horn as it is dispensed in a conventional filling operation, as will be described in more detail hereinafter.

In accordance with this invention, there is provided an overwrap sleeve 18 which is of an internal diameter to be telescoped over the casing strand 10 with a certain degree of clearance. The overwrap casing 12 is provided in shirred or gathered form, as is clearly shown in FIG. 2, and is of an internal diameter to be telescoped over the overwrap sleeve 18. The overwrap sleeve 18 is provided with a friction ring 20 which fits around a paid out portion of the overwrap casing 12 which is in tubular form and is telescoped over the overwrap sleeve 18.

It is to be understood that the friction ring 20 is mounted for movement with the overwrap sleeve 18 and that the overwrap sleeve has connected thereto suitable means (not shown) to effect rotation or twisting of the overwrap sleeve 18 about its axis.

In the encasing of a typical hollow shirred casing strand 10, a free end portion of the overwrap casing is initially telescoped over an end portion of the casing strand 10 as shown in FIG. 2. Then the overwrap sleeve and the overwrap casing carried thereby are rotated or twisted which results in the overwrap casing 12 which is telescoped over the casing strand 10 being twisted and interlocked with the casing strand 10, and at the same time that portion of the overwrap casing between the end of the overwrap sleeve 18 and the adjacent end of the casing strand 10 is necked down and reversely folded upon itself as the overwrap sleeve 18 is moved axially toward the casing strand, as is clearly illustrated in FIG. 3. The size of the necked down opening defined by the reversely folded portion of the overwrap casing will be controlled by the extent of rotation or twisting of the overwrap sleeve 18. It has been found that a rotation or twist angle on the order of 90° will suffice.

At this time it is desirable to identify the portions of the overwrap casing as applied to the casing strand. The first applied end portion is identified by the numeral 22 and the first formed twisted and necked down end portion by the numeral 24. The overwrap casing has formed in the necked down part thereof a reverse fold 26 and the twisted axially outer part of the overwrap casing is defined by the numeral 28. The necked down opening is identified by the numeral 30.

The one end of the casing strand 10 having been thus closed, the overwrap sleeve 18 is then advanced in telescoped relation over the entire length of the casing strand 10 and therebeyond to define an overwrap casing body portion 32 which is telescoped over both the initially applied end portion 22 of the overwrap casing and the entire casing strand 10. After the overwrap casing has been completely telescoped over the casing strand 10, it may be closed at the opposite ends of the casing strand 10 in one of two presently disclosed means. In the simplest form of the invention, the overwrap casing is moved to a point spaced beyond the opposite ends of the casing strand 10 using the overwrap sleeve 18, and at that point is cut off and the overwrap sleeve retracted. This extending portion of the overwrap casing 12 is identified by the numeral 34 and is tensioned and then gathered by means of a clipping device 36, which is conventional, and which clipping device 36 applies to the gathered overwrap casing portion 34 a conventional clip 38. In this manner the application of the overwrap casing 12 to the casing strand 10 is completed except that the overwrap casing body portion 32 may be secured to the portion 22 by a suitable bond 40 (FIG. 5) which may be a heat bond or could be a suitable adhesive bond.

Referring now to FIGS. 6–8, it will be seen that there is illustrated the manner in which the overwrap casing 12 may be closed at the opposite end of the casing strand 10 in a manner similar to the closing at the one end of the casing strand. The overwrap casing 12 is drawn by the overwrap sleeve 18 beyond the opposite end of the casing strand 10, as shown in FIG. 6. Then the overwrap sleeve 18 and the overwrap casing 12 are rotated or twisted while at the same time the overwrap sleeve 18 is gradually retracted so as to result in the necking down of the overwrap casing 12 disposed beyond the adjacent end of the casing strand and at the same time the overwrap casing is reversely folded in the manner previously described. The net result is that at the opposite end of the casing strand 10 the overwrap casing is formed with a twisted radially inwardly extending closure panel portion 42 which is connected by a reverse fold 44 to a radially outwardly directed closure panel portion 46. The reverse fold 44 defines a necked down opening 48 as previously described.

Thereafter, the overwrap sleeve 18 is withdrawn a short distance and then the overwrap casing is cut off so as to define a terminal overwrap casing portion 50 which is telescoped over the overwrap casing body portion 32 and a portion of the casing strand 10 at the opposite end thereof. The terminal portion 50 may be suitably secured to the body portion 32 as at 52 by a heat bond or like bond so as to prevent the overwrap casing from becoming untwisted at the opposite end of the shirred casing strand.

Referring now to FIG. 9, it will be seen that there is illustrated a conventional filling tube or stuffing horn 54 through which a product to be filled into the casing strand 10 passes. The manner in which the stuffing horn 54 is associated with a casing strand does not form a part of this invention, and therefore will not be further described. It will, however, be apparent from FIG. 9 that with the overwrap casing 12 still in place, the encased shirred casing strand 10 may be properly positioned on the stuffing horn 54 in a conventional manner by the folded portions 24, 28 of the overwrap casing at the one end of the shirred casing strand 10 flexing to enlarge the opening 30 and to receive the stuffing horn 54. The encased shirred casing strand is thus frictionally retained on the stuffing horn 54 as is the overwrap casing.

It is to be understood that the overwrap casing 12 has to have the closed end thereof at the opposite end of the casing strand 10 opened, and this is accomplished when the end is closed by means of a clip 38, by merely cutting away the end portion of the overwrap casing. On the other hand, when the casing strand is closed in the manner illustrated in FIG. 8, the overwrap casing may be removed by a simple peeling type operation. Once the then free end of the casing strand 10 is available, the stuffing operation proceeds in the normal manner and all of the casing strand 10 is dispensed, leaving the overwrap casing 12 on the stuffing horn 54. Before a new casing strand is applied to the stuffing horn 54, the overwrap casing 12 is removed and thrown away.

Although the above disclosure is directly solely to a preferred embodiment of the invention relating to the encasing of a shirred casing strand, it is to be understood that the invention is not so limited in that other tubular members may be enclosed in a like manner utilizing an overwrap casing. For example, the overwrap casing may be utilized to encase items such as rods, cylinders, rectangular boxes, spheres, etc. It is also not necessary that the neck-down region have a hole therethrough. In many instances it may be desired that the necking down be to the extent so as to form a seal so that products, including groceries, may be encased within the overwrap casing.

It is also pointed out here that while a complete closing of the casing may be obtained at the twisted end by a 180° twist, a greater assurance of no opening existing is obtained with more than a 180° twist.

It is also feasible to form the twisted end of the overwrap casing without a member or members being packaged contained therein. It is to be appreciated that if the overlay twist is locked in by bonding the body of the overwrap casing to the twisted end portion of the casing, the twist is locked in and the closure will remain intact.

It is also to be understood that it is feasible to close one end of the casing material by gathering and clipping in the normal manner and then, after the casing has been filled with the member or product to be wrapped, the opposite end of the overwrap casing may be closed by the twisting operation.

Although only several preferred embodiments of the overwrap casing and only one apparatus for applying the overwrap casing have been specifically illustrated and described herein, it is to be understood that minor variations may be made in the overwrap casing and the manner of applying the same without departing from the spirit and scope of the invention as defined by the appended claims.

I claim:

1. A member encased in an overwrap casing, said overwrap casing having a first end portion telescoped over one end portion of said member, said overwrap casing having a radially inwardly transversely extending portion at a free end of said member one end portion, said overwrap casing being reversely folded upon itelf at an inner end of said radially inwardly transversely extending portion to define a radially outwardly transversely extending portion, said overwrap casing having a body portion extending the full length of said member in telescoped relation to both said overwrap casing first end portion and said member, and said overwrap casing being closed at the other end of said member.

2. An encased member according to claim 1 wherein said overwrap casing one end portion is circumferentially twisted relative to said member and thereby interlocked with said member.

3. An encased member according to claim 2 wherein said overwrap casing body portion is secured to said twisted overwrap casing one end portion to prevent untwisting.

4. An encased member according to claim 2 wherein said overwrap casing radially inwardly transversely extending portion is formed by twisting.

5. An encased member according to claim 2 wherein said overwrap casing radially inwardly transversely extending portion and said overwrap casing radially outwardly transversely extending portion are formed by circumferentially twisting and folding.

6. An encased member according to claim 1 wherein said overwrap casing radially inwardly transversely extending portion is formed by twisting.

7. An encased member according to claim 1 wherein said overwrap casing radially inwardly transversely extending portion and said overwrap casing radially outwardly transversely extending portion are formed by circumferentially twisting and folding.

8. An encased member according to claim 1 wherein said overwrap casing is in the form of a net material.

9. An encased member according to claim 1 wherein said overwrap casing is closed at the other end of said member by being radially inwardly gathered and secured together by a fastener.

10. An encased member according to claim 1 wherein said overwrap casing is closed at the other end of said member by being radially inwardly gathered and reversely folded, and terminating in a second end portion telescoped over said body portion.

11. An encased tubular member according to claim 1 wherein said member is a hollow shirred casing strand.

12. An encased tubular member according to claim 1 wherein said member is a hollow shirred casing strand, and said radially inwardly and radially outwardly transversely extending portions define a necked down opening of a diameter no greater than an interior diameter of said shirred casing strand.

13. An encased tubular member according to claim 1 wherein said member is a hollow shirred casing strand, and said radially inwardly and radially outwardly transversely extending portions define a necked down opening of a diameter less than an exterior diameter of said shirred casing strand.

14. A method of encasing a member, said method comprising the steps of telescoping an end portion of a tubular overwrap casing over one end portion of a member, necking down the overwrap casing adjcent the one end of the member and radially inwardly and radially outwardly folding the overwrap casing at the member one end, telescoping a body portion of the overwrap casing over the overwrap casing one end portion and the entire length of the member, and closing the overwrap casing at the opposite end of the member.

15. A method according to claim 14 wherein after the overwrap casing end portion is telescoped over the member one end portion, the overwrap casing is circumferentially twisted relative to the member to both interlock the overwrap casing with the member and to neck in the overwrap casing.

16. A method according to claim 15 wherein the overwrap casing body portion is secured to the twisted overwrap casing end portion to prevent untwisting thereof.

17. A method according to claim 15 wherein the overwrap casing is carried by a sleeve of a cross section to telescope over the member, and said twisting is effected by rotating said sleeve about its axis.

18. A method according to claim 17 wherein the overwrap casing is provided in a shirred or gathered form.

19. A method according to claim 17 wherein the overwrap is provided in a shirred or gathered form and is retained on the sleeve by a friction ring.

20. A method according to claim 14 wherein the overwrap casing is closed at the opposite end of the member by radially inwardly gathering a portion of the overwrap casing extending axially beyond the opposite end of the member and then fastening together the gathered portion.

21. A method according to claim 14 wherein the overwrap casing is closed at the opposite end of the member by drawing the overwrap casing beyond the opposite end of the member, twisting the extending portion of the overwrap casing to effect both a necking down and a reverse folding of the overwrap casing at the opposite end of the member, and then drawing a portion of the overwrap casing back over a portion of both the overwrap casing body portion and the member.

22. A method according to claim 14 wherein the reversely drawn overwrap casing portion is secured to the underlying overwrap casing body portion to prevent untwisting.

23. An overwrap casing comprising a length of tubular casing material having a first portion extending from a free end of said material in a first axial direction, a radially inwardly direction transverse portion at the end of said first portion remote from said free end, a radially outwardly directed transverse portion adjacent to said radially inwardly directed transverse portion and joined thereto by a reverse fold, a body portion telescoped over said first portion and extending in a reverse direction beyond said first portion free end, and means closing said body portion at the opposite end of said material.

* * * * *